(12) United States Patent
Shymkiw

(10) Patent No.: US 7,314,245 B1
(45) Date of Patent: Jan. 1, 2008

(54) SHOCK DAMPING MOUNTING SYSTEM FOR VEHICLE PROTECTIVE DEVICES

(76) Inventor: Robert W. Shymkiw, 5346 Ambridge Dr., Calabasas, CA (US) 91301

( * ) Notice: Subject to any disclaimer, the term of this patent is extended or adjusted under 35 U.S.C. 154(b) by 151 days.

(21) Appl. No.: 10/942,415

(22) Filed: Sep. 14, 2004

(51) Int. Cl.
*B60J 7/00* (2006.01)
*B60Q 1/00* (2006.01)

(52) U.S. Cl. .................. 296/187.11; 293/142; 428/31; 362/499

(58) Field of Classification Search ........... 296/187.04, 296/187.09, 187.11; 293/120, 142, 128; 428/31; 362/499, 505, 541, 542
See application file for complete search history.

(56) References Cited

U.S. PATENT DOCUMENTS

| | | | | | |
|---|---|---|---|---|---|
| D364,704 | S | * | 11/1995 | Alger | D26/139 |
| 5,520,765 | A | * | 5/1996 | Zoller | 156/245 |
| 6,382,821 | B1 | * | 5/2002 | Heyer et al. | 362/509 |

* cited by examiner

*Primary Examiner*—Joseph D. Pape
(74) *Attorney, Agent, or Firm*—Bryce Deary

(57) ABSTRACT

A protective guard mounting system that provides a shock absorbing and dissipating means of attachment for vehicle exterior components or protective devices. The protective guards are adapted to protect vehicle components such as headlights, taillights, signal/corner and/or driving lights, or painted/non-painted steel/plastic body parts.

1 Claim, 3 Drawing Sheets

SHOCK DAMPING MOUNTING SYSTEM FOR VEHICLE PROTECTIVE DEVICES

BACKGROUND OF THE INVENTION

The automobile industry includes manufacturers of products that allow owners to customize the look and functionality of their vehicles. In particular, the disclosed invention concerns the class of customizing products referred to as guards or deflectors. These products are typically mounted to a vehicle with the purpose of protecting a vulnerable part of the vehicle from impacts with road debris, brush, rocks, shopping carts, or other hazards. Vehicle parts which are often particularly vulnerable are the plastic or glass lenses of the various lights including the headlights and taillights. In modern vehicles, these lens assemblies are typically mounted at the 4 corners of a vehicle where they are vulnerable from 2 sides. Additionally, these lens assemblies may be complex in shape and integrated into the overall appearance and aesthetics of the vehicle which often makes them very expensive to replace.

The typical brush guard is fabricated from metal and mounted to the vehicle via one or more brackets which are attached to the vehicle body or directly to the part being protected. Attachment is typically accomplished by drilling new holes or by utilizing existing attachment points. Existing attachment points are typically accessed by disassembling a portion of the vehicle. Both drilling new attachment points and utilizing existing ones have distinct disadvantages. Drilling can cause disruption of a vehicles corrosion protection and must be repaired if the guard assembly is later removed. Disassembling the vehicle also has disadvantages. A disassembled part may be damaged during disassembly and then reassembly. A skilled service person usually must perform the operation, often using specialized tools. Reassembly must be carefully performed to avoid misalignment, especially with headlights.

The shape of modern lens assemblies is often complex with multiple light sources. Any guard must protect the lens but minimize light obstruction. The complex shape of the lens is often a result of the lens being formed to match or continue the contours of the vehicle body. A guard will have greater consumer acceptance if it does not interfere with the overall vehicle aesthetic. To minimize this impact, a guard should be low profile and as form-fitting as possible. This is often very difficult with systems incorporating brackets since the brackets can often be seen and can cause the guard to appear to be sticking out from the vehicle.

Other methods of attachment are available for affixing components to a vehicle exterior. One common method for attaching decorative molding and small accent pieces is by using double sided adhesive tape. This tape typically has a pressure sensitive adhesive on both sides of a plastic film. A popular product uses acrylic foam as the center film and is produced by numerous adhesive film manufacturers like 3M or Avery Dennison. The use of foam is intended to fill small voids between the surfaces of a rigid part being applied and the rigid vehicle body. The foam is not generally intended to provide any significant shock isolation. The use of two sided adhesive tape has the advantage that the attachment device is substantially hidden from view. In addition, no special tools are necessary and no vehicle modification need be performed by skilled workers. Finally, it is often possible to remove taped-on parts with minimum damage to the vehicle and often the part itself.

What is needed is a system for attaching a protective guard onto or around a vulnerable vehicle component which can be installed by any vehicle owner, without special tools, and without drilling or disassembling the vehicle. The guard should have a low profile and complement the overall vehicle aesthetics.

SUMMARY OF THE INVENTION

The disclosed invention describes a protective guard and system of attachment consisting of an aesthetically attractive, low profile, grill structure adapted to the shape of and attached directly to a vehicle component, such as a headlight lens, using an attachment device consisting of layers of adhesive and energy absorbing/dissipating material. In general the disclosed invention is ideally suited for protecting plastic or glass lens assemblies on motor vehicles from accidental damage. The system could also be used to protect other vulnerable parts.

The protection system consists of two major components. The first is the guard assembly which is a cage or grid of metal ribs attached to a flat frame. The frame is typically adapted to a shape which closely matches the perimeter of the vehicle lens to be protected. The frame has a contacting surface which is substantially parallel to the surface of the lens. The metal ribs of the grid are also formed to match the shape of the lens; however, the grid is offset in a direction away from the lens so that a gap exists between the grid and the lens such that any impact energy imparted to the grid will be transferred to the frame instead of the lens.

The second component is the energy absorbing attachment system which affixes the frame to the perimeter of the lens. The attachment system is a multi-layer strip consisting of two adhesive layers on each face of the strip and one or more inner layers consisting of a structural energy absorbing material such as rubber, urethane, or other plastics. Additional layers may also be present between the adhesive layers and the energy absorbing layers. These additional layers could be of materials designed to transfer heat such as aluminum foil or of materials designed to present a color.

The disclosed invention can be used to affix a guard directly to the surface of a lens or it could also be used to affix a guard to a surrounding surface, such as the vehicle body, such that the component to be protected is under the guard.

The spacing of the ribs within the protective grid is determined by its intended use. The factors contributing to the grid spacing and rib placement include the size of the debris to be deflected, the position of the light sources within the lens assembly, and the position of any fasteners used to hold the lens to the vehicle. A unique set of guard assemblies are typically required for every vehicle model.

BRIEF DESCRIPTION OF THE DRAWINGS

Referring now to the drawings in which like reference numbers represent corresponding parts throughout.

DETAILED DESCRIPTION

In the following description of the preferred embodiment, reference is made to the accompanying drawings that form a part hereof, and in which is shown by way of illustration one or more embodiments in which the invention may be practiced. It is to be understood that other embodiments may be utilized and structural changes may be made without departing from the scope of the present invention.

Overview

The disclosed invention describes a system for attaching an aesthetically attractive protective guard to a vehicle. The guard is a low profile grill structure adapted to the shape of an underlying vehicle component. It is typically attached directly to a vehicle component, such as a headlight lens, using an attachment device consisting of layers of adhesive and energy absorbing/dissipating material. The device is well suited for the "do-it-yourself" market and is also very attractive to vehicle customizers because it typically can be installed using no tools, does not require the disassembly or modification of the vehicle, and has a visual impact consistent with the original vehicle aesthetic.

Specifics of the Invention

The disclosed invention describes a protective guard and system of attachment. The guard is an attractive grill structure which is adapted in shape to conform to a specific vehicle or family of vehicles. The guard is primarily intended to protect vulnerable vehicle body assemblies such as plastic or glass lens assemblies containing headlights 16, taillights 12, brake lights, and/or marker lights, although it could be adapted to protect other vehicle features or assemblies.

Figure 1:
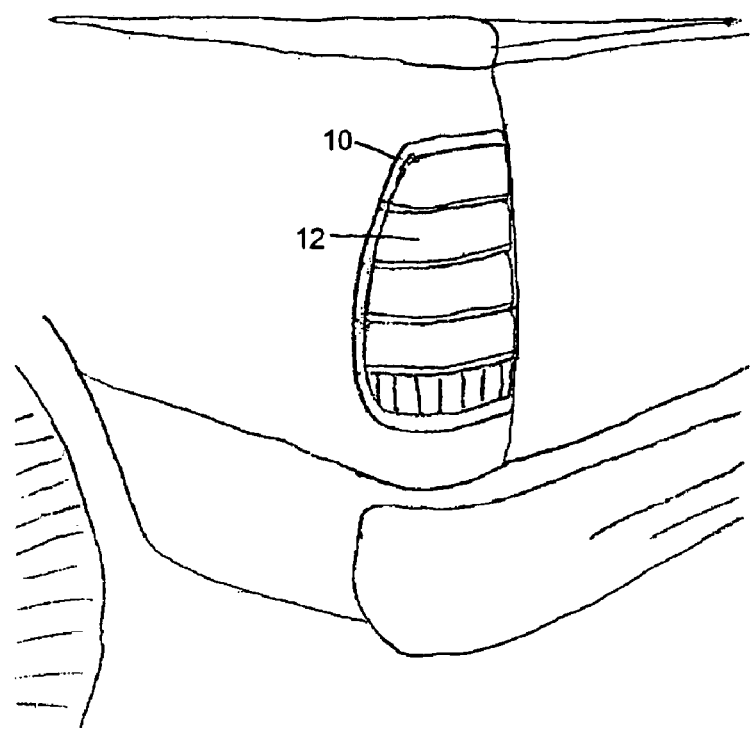
FIG. 1 is the left rear view of a light duty truck showing the left taillight with the guard of the disclosed invention mounted in place.
Figure 2:
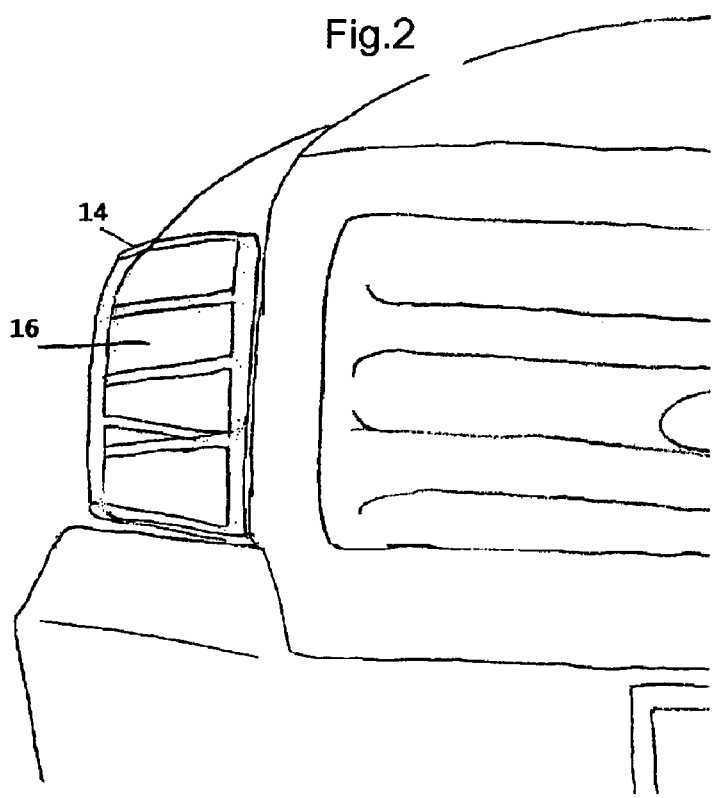
FIG. 2 is a front right view of a light duty truck showing the right headlight with the guard of the disclosed invention mounted in place.

FIGS. 1 and 2 show a typical installation of the guard system on a light duty truck. FIG. 1 shows a taillight guard 10 in position over the left rear taillight assembly 12. FIG. 2 shows a headlight guard 14 over a front right headlight assembly 16.

The invention is an improvement over the existing methods of attaching guards. It creates a very low profile, form-fitting guard which integrates well into the existing vehicle aesthetics. The guard attaches directly to the face of a lens assembly, FIGS. 1, 2, or alternately it could be mounted outside the perimeter of a lens assembly with the lens assembly beneath the guard.

Figure 6:
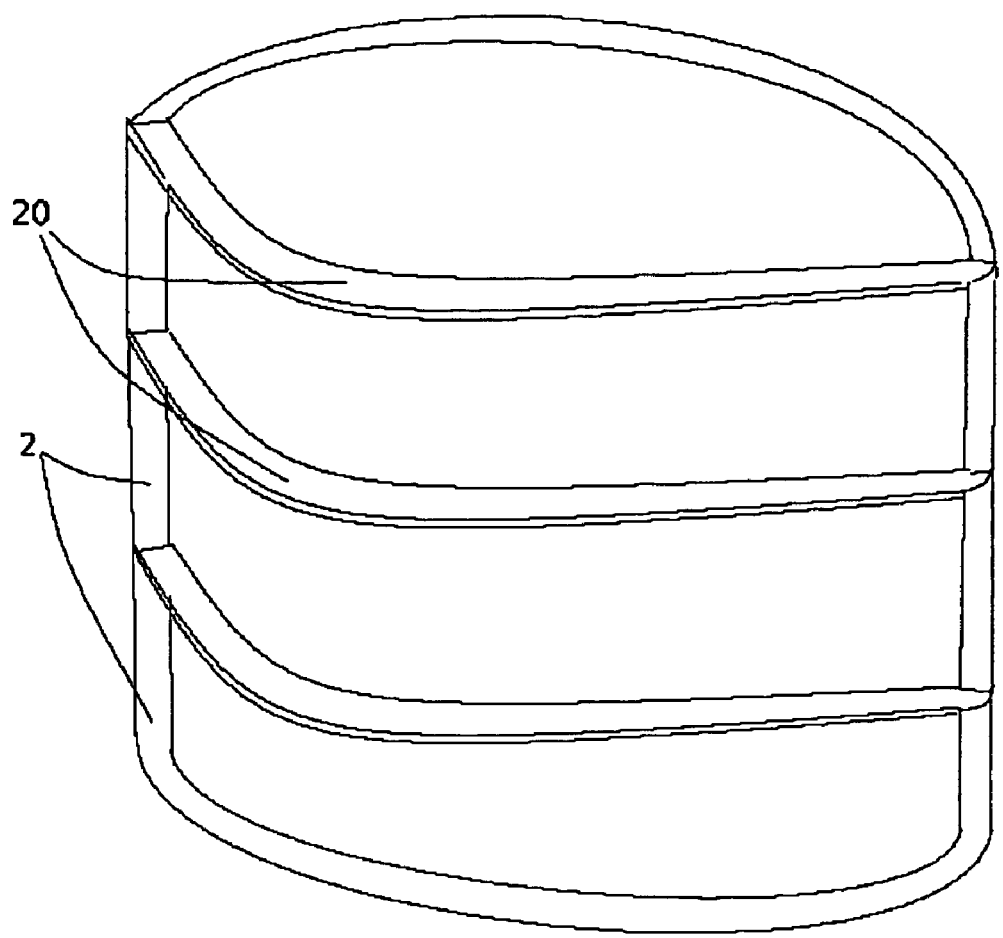
FIG. 6 is a guard assembly showing one possible orientation of ribs and a frame.

FIG. 6 shows a guard assembly which is comprised of a grid or ladder structure made up of ribs of flat metal 20. Said ribs are oriented such that a force normal to the protected lens assembly would strike a flat rib 20 on its outward facing edge. The ribs 20 are oriented in this manner to provide the greatest strength while presenting the lowest cross section to the light coming from the protected lens assembly. The ribs, in the form of a grid or ladder, are attached to a frame 2 which makes up the perimeter of the guard and is adapted to match the vehicle surface to which it will be attached. Force applied to the protective portion of the guard is transferred through the ribs to the frame where it is more widely distributed. While FIG. 6 shows a guard with a ladder arrangement of ribs 20, a guard with vertical or intersecting ribs is also anticipated.

The guard is affixed to the vehicle through strips of energy absorbing material which also includes adhesives on its surfaces. The energy absorbing material is positioned between the guard frame 2 and the surface of the vehicle 4 at the attachment point of the guard. Forces which have been transferred into the guard frame are further transferred into the energy absorbing layers 6 where they are more widely dispersed and absorbed before the force is finally transmitted to the vehicle itself.

Each guard assembly is adapted to fit a specific vehicle. Rib position and orientation depend on the shape of the underlying lens assembly and the location of the light sources within the assembly. The ribs 20 of the guard assembly are perpendicular to the surface of the protected vehicle assembly and are oriented to generally minimize any intrusion into the light path of headlights or taillights.

Figure 3:
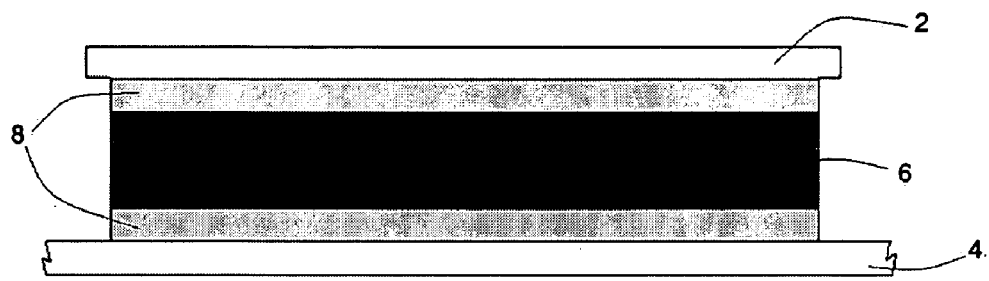
FIG. 3 is a cross section of the energy absorbing material of the current invention showing the embodiment which includes two outer adhesive layers
Figure 4:
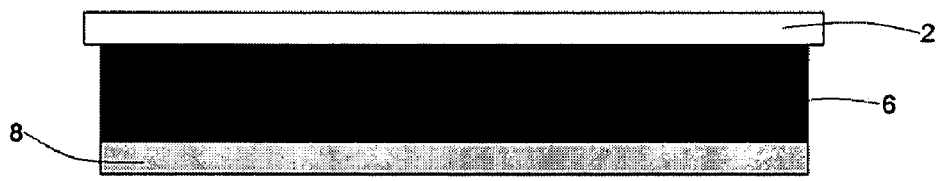
FIG. 4 is a cross-section of an alternate embodiment of the energy absorbing material showing one adhesive layer and prior direct bonding to the protective guard.
Figure 5:
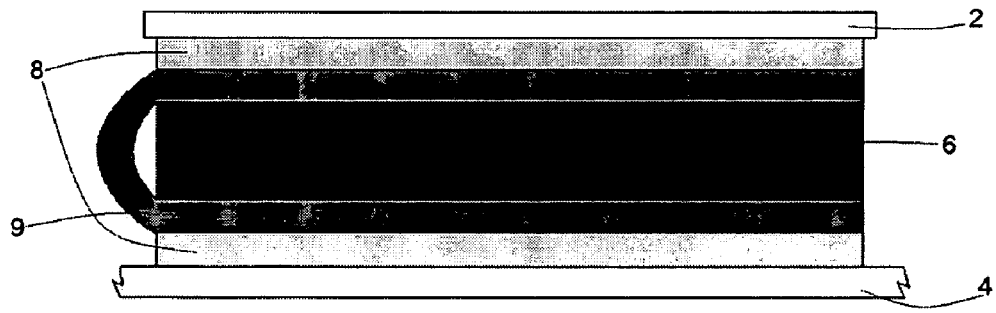
FIG. 5 is a cross-section of an alternate embodiment of the energy absorbing material showing an additional pair of layers that are connected to each other over one of the edges of the material thereby covering any interstitial layers and providing a means to insert an color accent or move heat.

FIGS. 3, 4, and 5 show three possible embodiments of the energy absorbing material in cross section. The energy absorbing attachment strip is formed from one or more layers with the center layer 6 being an energy absorbing layer of rubber, urethane, closed cell foam, or other elastic material which is both compressibly elastic and rigid enough to hold the guard to the vehicle. The two outer surfaces of the attachment strip are coated with an adhesive 8 to bond the attachment strip to the guard frame 2 on one side and the vehicle 4 on the other. An adhesive layer 8 is accomplished by applying glue or by the use of a double-sided tape. Since the product is intended for sales in packaged sets, any glue surfaces or double sided tape surfaces would necessarily be provided with a peel-off backing strip which is not shown in the figures. Additional layers of material, not indicated in the drawings, could also be incorporated such as metal foils or Mylar for the purpose of isolating elastic layers from heat generated by light bulb.

FIG. 5 shows an additional embodiment that includes an optional layer 9 that wraps around one or both edges of the attachment strip to provide a color edge or to extend the heat-dissipating layer from the vehicle side to the guard side.

The energy absorbing attachment strip can be manufactured as a linear strip and then bent to conform to the shape of the guard frame. In an alternate embodiment, the energy absorbing attachment strip can be cut or punched from one or more sheets of material to create one or more pre-shaped gasket-like assemblies.

A tradeoff between manufacturing complexity and consumer cost would suggest two typical forms of delivery to the consumer. A first form would be for the guard to be shipped without the energy absorbing attachment system affixed to the guard. In this form the attachment system would have pressure sensitive adhesive tape or other consumer usable adhesive 8 on both outer surfaces as indicated in FIG. 3.

In an alternate embodiment, shown in FIG. 4, the energy absorbing attachment system would be pre-installed onto the back of the guard frame 2 during manufacture. This has the advantage of ensuring proper alignment of the guard onto the attachment strip. Additionally, this second embodiment allows the use of industrially applied adhesives to bond the guard frame to the attachment strip resulting in a more consistent fit and finish of the final installation.

The disclosed invention is typically used to affix the guard directly to the surface of a lens assembly. No special tools are required; however, proper cleaning of the contacting surfaces should be performed. An alternate embodiment is to affix the guard to the vehicle body. In this case, the protected vehicle assembly would be partially or completely surrounded buy the guard frame. This embodiment is appropriate for smaller or recessed assemblies such as side marker lights.

The foregoing description of the preferred embodiments of the invention has been presented for the purposes of illustration and description. It is not intended to be exhaustive or to limit the invention to the precise forms disclosed.

What is claimed is:

1. A protective guard assembly, installable without tools, for protecting a vehicle lens from impact damage, comprising:
  a metal guard, consisting of
    a frame adapted to conform to a specific attachment region on a vehicle, and
    one or more ribs attached to the frame thereby partially covering the lens, and
  an energy absorbing attachment material, wherein the attachment material consists of two outer adhesive layers and one or more interstitial energy absorbing layers, said adhesive layers when placed in contact with both the metal guard frame and the attachment region accomplishes the attachment of the guard to the vehicle with the energy absorbing material acting as both attachment means and shock absorber.

* * * * *